United States Patent [19]

Häussler et al.

[11] Patent Number: 5,444,643

[45] Date of Patent: Aug. 22, 1995

[54] METHOD FOR PROGRAMMING A BUS-COMPATIBLE ELECTRONIC MOTOR VEHICLE CONTROLLER

[75] Inventors: Bernd Häussler, Ostfildern; Thomas Thurner, Kirchheim; Karlheinz Müller, Friedrichshafen, all of Germany

[73] Assignee: Mercedes-Benz AG, Stuttgart, Germany

[21] Appl. No.: 117,838

[22] Filed: Sep. 8, 1993

[30] Foreign Application Priority Data

Sep. 8, 1992 [DE] Germany .................... 42 29 931.4

[51] Int. Cl.⁶ .................... G06F 9/00; G06F 13/00
[52] U.S. Cl. .................... 364/579; 364/242.94; 364/238.3; 364/239; 364/240; 364/240.5
[58] Field of Search .................... 364/579, 242.94, 238.3, 364/238.6, 239, 239.6, 239.7, 239.8, 239.9, 240, 240.1, 240.5, 240.8, 242.2, 242.4, 242.6, 242.92, 242.95, 242.96; 395/200, 275, 700, 250, 550; 340/825.5

[56] References Cited

U.S. PATENT DOCUMENTS

| | | | |
|---|---|---|---|
| 4,631,666 | 12/1986 | Harris et al. | 364/200 |
| 4,739,323 | 4/1988 | Miesterfeld et al. | 340/825.5 |
| 4,739,324 | 4/1988 | Miesterfeld et al. | 340/825.5 |
| 4,742,349 | 5/1988 | Miesterfeld et al. | 340/825.5 |
| 4,751,633 | 6/1988 | Henn et al. | |
| 4,787,028 | 11/1988 | Finfrock et al. | 364/200 |
| 4,803,623 | 2/1989 | Klashka et al. | 364/200 |
| 4,858,101 | 8/1989 | Stewart et al. | 364/131 |
| 5,060,140 | 10/1991 | Brown et al. | 364/200 |
| 5,165,022 | 11/1992 | Erhard et al. | 395/275 |
| 5,175,845 | 12/1992 | Little | 395/550 |
| 5,283,900 | 2/1994 | Frankel et al. | 395/700 |
| 5,307,463 | 4/1994 | Hyatt et al. | 395/275 |
| 5,323,385 | 6/1994 | Jurewicz et al. | 370/43 |

FOREIGN PATENT DOCUMENTS

0270680  5/1987  European Pat. Off. .
0515760  5/1991  European Pat. Off. .

OTHER PUBLICATIONS

Phall et al., Automotive Components Handbook, 1988, pp. 7-2 through 7-23.
Intel Automotive Components Handbook, 1987, Chapters 7, 8, 9. "In—Vehicle Networking Background Info."

Primary Examiner—Emanuel T. Voeltz
Assistant Examiner—Patrick J. Assouad
Attorney, Agent, or Firm—Evenson, McKeown, Edwards & Lenahan

[57] ABSTRACT

A method for programming a bus-compatible electronic motor vehicle controller that is equipped with at least one microcomputer to implement its control function and with ROM and RAM in order to accommodate and handle applications software required for the control function, and is also equipped with at least one bus protocol chip, the ROM being programmed such that the applications software communicates with a bus via the bus protocol chip and via a specific instruction and communications interface forming a first interface of the bus protocol chip. The method includes providing a second interface, which is independent of the bus protocol chip, and defining the second interface as a further, universal instruction and communications interface. The first and second interfaces are coupled with a driver module that is independent of the applications software and adapted to the bus protocol chip and has the properties of an adapter. The applications software are matched and aligned exclusively to the second interface with respect to the bus communication and the applications software is produced independently of the bus protocol chip. The applications software and the driver module are linked to one another by a link process. Program code is obtained as a result of the link process. The program code is stored such that the program code is resident in the ROM.

5 Claims, 3 Drawing Sheets

▨ VIRTUAL UNIT OF THE INFORMATION TRANSMISSION SYSTEM

METHOD FOR PROGRAMMING A BUS-COMPATIBLE ELECTRONIC MOTOR VEHICLE CONTROLLER

BACKGROUND AND SUMMARY OF THE INVENTION

The present invention relates to a method for programming a bus-compatible electronic motor vehicle controller that is equipped with at least one microcomputer to implement its control function and with ROM and RAM in order to accommodate and handle applications software required for the control function, and is also equipped with at least one bus protocol chip, the ROM being programmed such that the applications software communicates with a bus via the at least one bus protocol chip and via a specific instruction and communications interface forming a first interface of the at least one bus protocol chip.

The increased use of electrical and, in particular, electronically controlled actuators, motors and units in motor vehicles makes ever more extensive wiring necessary. The increasing number of contacts and cables results in a growing manufacturing cost, space problems within the bodywork and reliability which is falling overall, with increasing costs. Fault tracing becomes ever more time-consuming.

The CAN (Controller Area Network) concept was developed in order to create a remedy for this. This concept comprises a serial bus network having a special data transmission protocol into which all the corresponding components are linked and which allows quasi-real-time use with very high operational reliability.

In the context of this new concept, all the controllers and operating apparatuses which are intended to be operated in such a bus network are equipped with suitable hardware and software means so that they respond in accordance with the bus protocol, are activated without any mutual adverse effect and can pass data or control commands preferably using the broadcast method over the network. In practice, this is implemented per controller by means of a bus protocol chip, also referred to as a CAN controller or a CAN chip for short in the following text. The CAN controller is connected to the bus, operates this bus and communicates with the respective microcomputer or microcomputers that are suitably programmed for this purpose of the controller for the specific application.

The multiplicity of bus-relevant controllers in a vehicle and the consequent additional delivery from different manufacturers accordingly has the consequence that comparable accesses to, and communication functions of the respective controller-specific applications software on the bus must be carried out separately by each controller manufacturer. These depend on the CAN controller used and, in practice, are also carried out in a different manner in each case. This not only has the consequence of a considerable time expenditure, for the programming of the individual controllers. The access times, which differ and are scattered depending on the programming, from the application via the CAN controller to the bus can produce concealed problems. This can happen, for example, in the case of real-time operation of a large number of controllers from different manufacturers, even if all the apparatuses conform to the bus protocol respectively considered on their own.

An object of the invention is to create a method which allows simple, time-saving, reliable programming, minimizing the aforementioned problems, of very different motor vehicle controllers for bus operation.

This and other objects are achieved by the present invention which provides a method for programming a bus-compatible electronic motor vehicle controller that is equipped with at least one microcomputer to implement its control function and with ROM and RAM in order to accommodate and handle applications software required for the control function, and is also equipped with at least one bus protocol chip, the ROM being programmed such that the applications software communicates with a bus via the at least one bus protocol chip and via a specific instruction and communications interface forming a first interface of the at least one bus protocol chip. The method includes providing a second interface, which is independent of the at least one bus protocol chip, and defining the second interface as a further, universal instruction and communications interface. The first and second interfaces are coupled with a driver module that is independent of the applications software and adapted to the at least one bus protocol chip and has the properties of an adapter. The applications software are matched and aligned exclusively to the second interface with respect to the bus communication and the applications software is produced independently of the at least one bus protocol chip. The applications software and the driver module are linked to one another by a link process. Program code is obtained as a result of the link process. The program code is stored such that the program code is resident in the ROM.

The method according to the invention makes the bus protocol chip or chips (CAN controller) which is or are used in each case in a motor vehicle controller "invisible" for the programmer of the respective applications software. Since the bus protocol chip or chips are thus to a certain extent "concealed" from the applications software, the type of bus protocol chip or chips used in each case is no longer significant.

This concealment is carried out in that a universal interface, which is independent of the bus protocol chip or chips, is defined in the sense of an instruction and communications interface. A driver module, which is tailored to the relevant bus protocol chip or chips and has the properties of an adapter, is produced, independently of the applications software, for the purpose of coupling the interface to the instruction and communications interface or interfaces of the bus protocol chip or chips. The controller-specific applications software is matched and aligned, with respect to the bus communication, exclusively to the interface and, to that extent, is produced independently of the bus protocol chip or chips. The applications software, which is independent of the bus protocol chip or chips, and the application-independent driver module are linked to one another by a link process. The program code which is thus obtained is stored such that it is resident in the ROM of the at least one microcomputer of the controller.

The link storage of the CAN controller-specific driver module together with the respective applications software in each individual one of a multiplicity of controllers thus saves unnecessary software development time for identical or similar communications steps and operations.

By reduction of the operations to be carried out on the applications side to only a few, simple but powerful routines, which are to be carried out in the direction coming from the application to the bus or from the bus to the application, a very high operating reliability and real-time compatibility of many controllers in a CAN bus network can be achieved as well, while corresponding driver modules for different bus protocol chips or CAN controllers can in each case be developed, tested and made available centrally.

In certain embodiments of the invention, at least the network management functions are combined in a further module, and if this further module is additionally linked analogously to the driver module of the applications software, the programmer of the applications software can be freed of calling up, addressing and/or management algorithms which are required for interaction in the network of the relevant motor vehicle controller with others.

Other objects, advantages and novel features of the present invention will become apparent from the following detailed description of the invention when considered in conjunction with the accompanying drawings.

DETAILED DESCRIPTION OF THE DRAWINGS

In the following text, the abbreviation "CAN chip" is always understood to mean the bus protocol chip to be fitted in hardware terms. It should expressly be noted that the "CAN chip" can also be understood to mean a plurality of suitable types which to a certain extent are a substitute for, or implement .a more powerful CAN chip. Furthermore, "application" is understood to mean the handling of the applications software, that is to say the specific operating and system software of a respectively considered controller on its (applications) hardware, having the effect of the desired control function.

Figure 1:
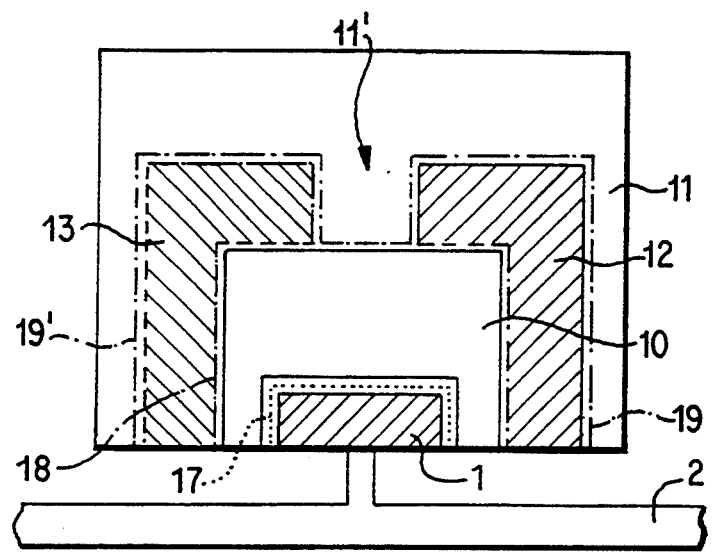
FIG. 1 shows a structural outline illustrating the embedding of the driver module between the bus protocol chip and the applications software in accordance with the present invention.

According to FIG. 1, the applications software 11 does not communicate with the bus 2 via the CAN chip 1 independently. With respect to the information traffic using the bus 2, the driver module 10, which is to be produced in accordance with the method of the present invention, rather represents an intelligent adapter via which every communicative access to the bus 2 or to the applications software 11 takes place. This leads to a decoupled or insulating function of the driver module 10 between the CAN chip 1 or the bus 2 and the applications software 11.

As a rule, the applications software 11 can be produced by the producer or supplier of a controller. The driver module 10 can be produced, for example, by the vehicle producer who then makes it available to suppliers of bus-compatible controllers for the purpose of generation of their software. In this way, it can easily be ensured that the production and testing of the driver module 10 takes place using the same test criteria as those which are also used in bus testing systems in production and servicing of the vehicle producer. In this way, systematic software incompatibilities are precluded and local defects and their cause or causes can easily be identified.

A network management module 12, which is to be produced separately, can also be linked in between the driver module 10 and the applications software 11. Analogously thereto, another special communications module 13 can furthermore be produced and linked in between the driver module 10 and the applications software 11. However, the application 11 in any case always has available a free access 11' to the driver module 10 via the CAN driver interface 18. However, as a rule, subject to specific preconditions it can be more advantageous to install communications routines in the applications software 11 from the start, as is the basis, for example, of the illustration explained later in FIG. 6.

A special network management module 12 can, for example, fulfill tasks in conjunction with the operation of further controllers on the bus or enabling a single wire standby mode if, for example, one of two electrical bus wires is connected to earth or the supply voltage. A special communications module 13 can, for example, combine those parts of communications routines which are identical for a plurality of controllers. For example, it can include application-specific handler routines or even special communications functions, such as copying functions, like the precopying and in a function which is mentioned below, in conjunction with elements for reception filtering.

A first interface 17, specifically the instruction and communications interface of the CAN chip, a second interface, specifically the CAN driver interface 18 which is to be defined in accordance with the invention, and, furthermore, a management interface 19 and an interface 19' of the application 11, which interface 19' corresponds to the management interface 19 and is to be specified depending on the filling of the communications module 13, are shown in the form of envelopes of the modules.

Figure 2:
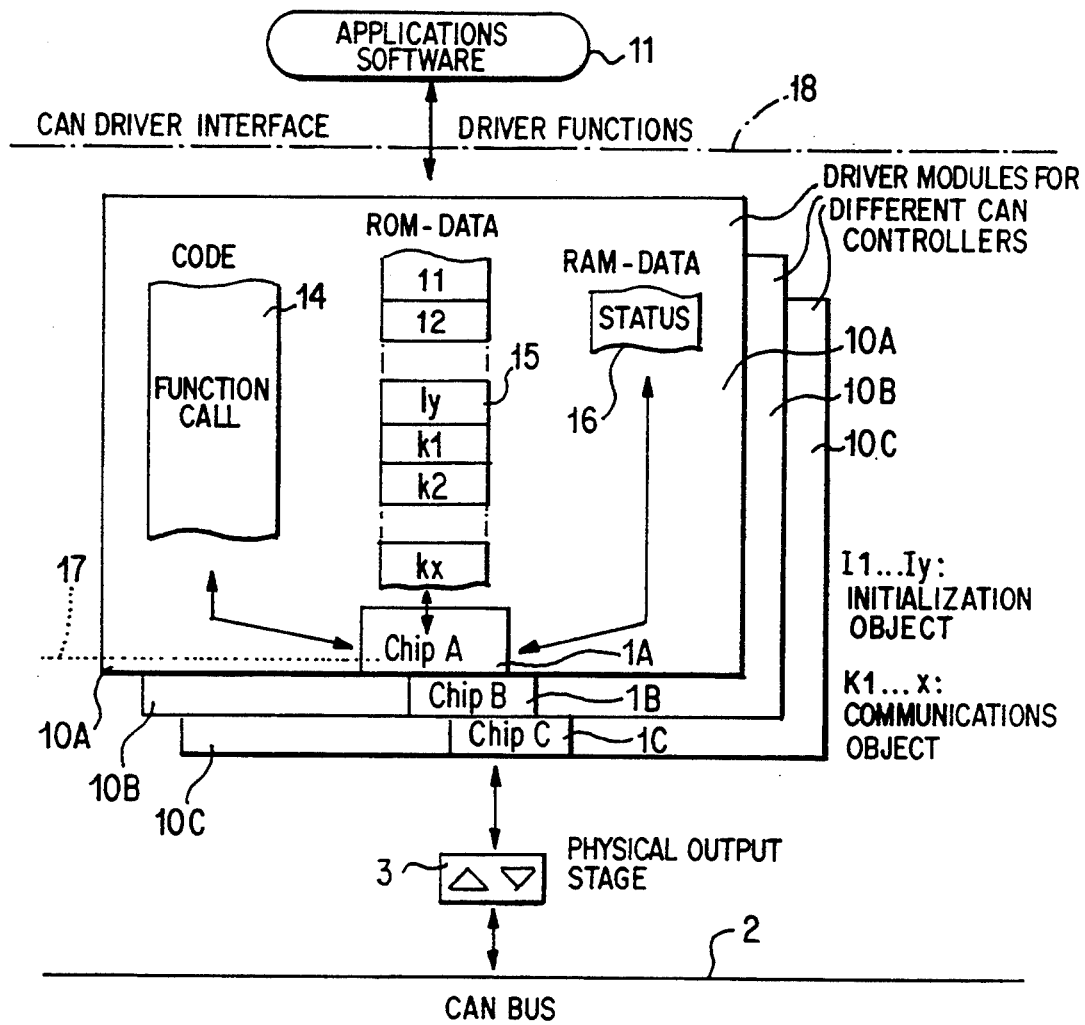
FIG. 2 shows a schematic illustration of the adapter function of the driver module and its CAN chip specific interchangeability.

Functional elements of the driver module 10 which is to be produced in accordance with the invention are shown in FIG. 2.

The driver module 10A comprises, inter alia, a logic code 14. This code 14 to a certain extent translates the CAN chip type-specific instruction code from the level of the first interface 17 into a standardized instruction format at the level of the CAN driver interfaces 18 which the applications software 11 accesses. The logic code 14, which is stored in the ROM of the application, in this case fulfills a function comparable to that of an adapter or interface to the simple but powerful interface 18 having its own functional intelligence. On the one hand, this relieves the load on the application (and hence the applications) of elementary communications tasks and, on the other hand, ensures that the CAN chips are programmed correctly and in a common manner throughout the network.

The driver module 10 furthermore comprises a data field 15 which is stored either completely or predominantly in the ROM of the controller hardware. This comprises at least an initialization structure and a communications structure, initialization objects I1 ... Iy and communications objects K1 ... Kx.

Furthermore, the driver module 10A additionally has another (small) RAM area in order to control, for example, status information items or a waiting queue there in a volatile data field 16 or, for example, to manage functional return values.

The initialization structure contains data by means of which the registers or memory cells of the CAN chip are loaded as a function of the currently selected initialization variant.

The communications structure is broken down into a transmission structure and a reception structure, each of which comprise transmission communications objects and reception communications objects respectively. The transmission and reception structures contain information items on the data to be transmitted or received respectively and the necessary pointers which define the areas to be used in the RAM of the controller or CAN register.

FIG. 2 furthermore shows that there is in each case one corresponding driver module 10A, 10B, 10C ... for CAN chips 1A, 1B, 1C etc. Different CAN chips 1A to 1C, connected in the same way to the CAN bus 2 via output and reception states 3, thus have allocated to them correspondingly different driver modules 10A to 10C. At least the code 14 and individual data objects in the data field 15 in each case vary, in accordance with the different properties of the various CAN chips 10A ... 10C, for corresponding driver modules.

Figure 3:
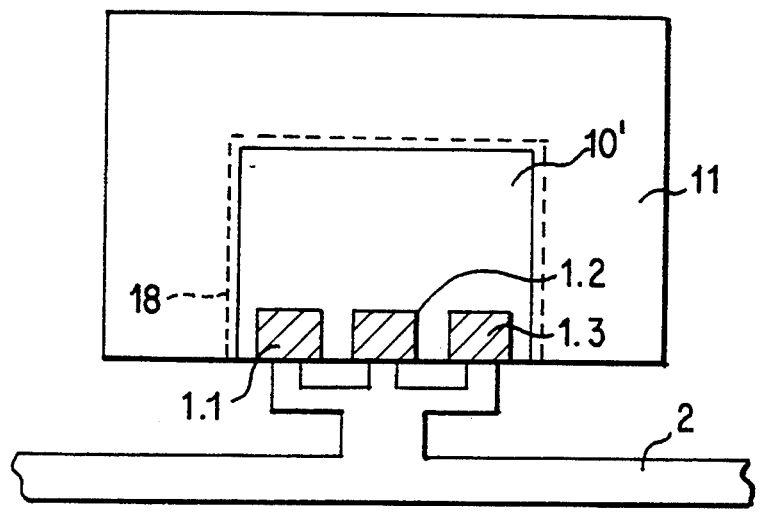
FIG. 3 shows a schematic illustration of a suitable driver module for adaptation of three CAN chips to the application.

In the sense of FIG. 3 the CAN chip 1 can also comprise a plurality of actual bus protocol modules 1.1, 1.2, 1.3, etc. which overall act like an integral chip between the applications software 11 and the bus 2. Without limiting the generality, a suitably constructed driver module 10' implements the driver interface 18 here as well and then "conceals" a corresponding plurality of CAN chips from the programmer of the applications software.

However, a common nature of the CAN driver interface 18 is identical to all the driver modules 10A, 10B, 10C so that the functional call-up, on the applications side, of the driver module can always be carried out using the same data object reference, that is to say independently of the CAN chip used.

In the production of the driver module, the logic driver code is constructed overall, for example, such that, after linking with the applications software, the logic driver code carries out the following functions in conjunction with the above-mentioned data:

a. Initialization

The CAN communications paths and the CAN controller are initialized before a communication starts. This is done by calling up the function Init {pointer to the initialization object}

For this purpose, all the necessary parameters for chip initialization in accordance with the CAN protocol are stored in the initialization object which forms the argument of the initialization call.

b. Transmission of data

For the transmission of data, a transmission communications object is defined in which, inter alia, an identifier which identifies the relevant CAN information and a pointer to the RAM address of the applications variable to be transmitted are stored. Data are transmitted simply by calling up the function Transmit {pointer to the transmission communications object}

This call results in the relevant applications variable being copied into the CAN chip or into the driver (specifically, for example, into a waiting queue, see below), by means of the communications object. Subsequently, its transmission to the bus preferably takes place asynchronously, which means that the applications software is not waiting for an acknowledgement of the successful transmission process. However, it is informed of this at the earliest possible point in time. The successful handover of the applications variable into the responsibility of the driver module of the application is also indicated.

c. Transmission interruption

The special function

Cancel {pointer to the transmission communications object} is provided for the purpose of interrupting or cancelling execution of a call which has already been made to send information. Calling it cancels a previous transmit call by deleting the transmission job in the driver or - if it has already been written into the transmission buffer register of the CAN chip but has not yet been sent there as well.

d. Reception

In contrast to convenient CAN chips having their own RAM (for example FULLCAN chips), simpler CAN chips (for example BASICAN chips) are not able to completely filter on their own all the information which they are able to or should overall receive.

These simpler CAN chips have only one register which is opened for the purpose of loading as a "reception window" if the identifier of a CAN message falls in a predetermined mask. The selection or acceptance testing from a multiplicity of data which can be fetched from this register must therefore take place outside such a simpler CAN chip.

The driver module 10 is preferably constructed such that it also carries out this function, in that it handles the reception mode in an interrupt-controlled manner. For this purpose, one reception communications object is defined for each information type to be received. The identifier which identifies the relevant CAN message and a pointer to the target variable in the RAM of the application are stored, inter alia, therein. By means of the simple call Receive {pointer to the reception communications object} the received data are copied from the reception buffer register of the CAN chip into a memory location, which is provided for relevant received dam, in the RAM of the application (target variable). The driver module thus to this extent deselects all the undesired reception communications objects.

In this way, irrespective of the actual CAN protocol chip, the function, for example, of a more convenient CAN chip, for example a FULLCAN chip, is substituted for, which, as a result of the equipment with its own RAM, can hold and control an acceptance list for all the information items which are to be received overall and are to be written into predetermined RAM areas of the applications controller.

It can be seen that the relevant identifiers that need be known only to the producer of the driver module 10 are listed in the ROM list 15 of the driver module, but the application and the programmer who is producing the applications software do not need to know them since received data which are intended to be further processed always need to be retrieved only from predetermined, defined memory cells of the applications RAM.

e. Precopy and postcopy

Figure 5:
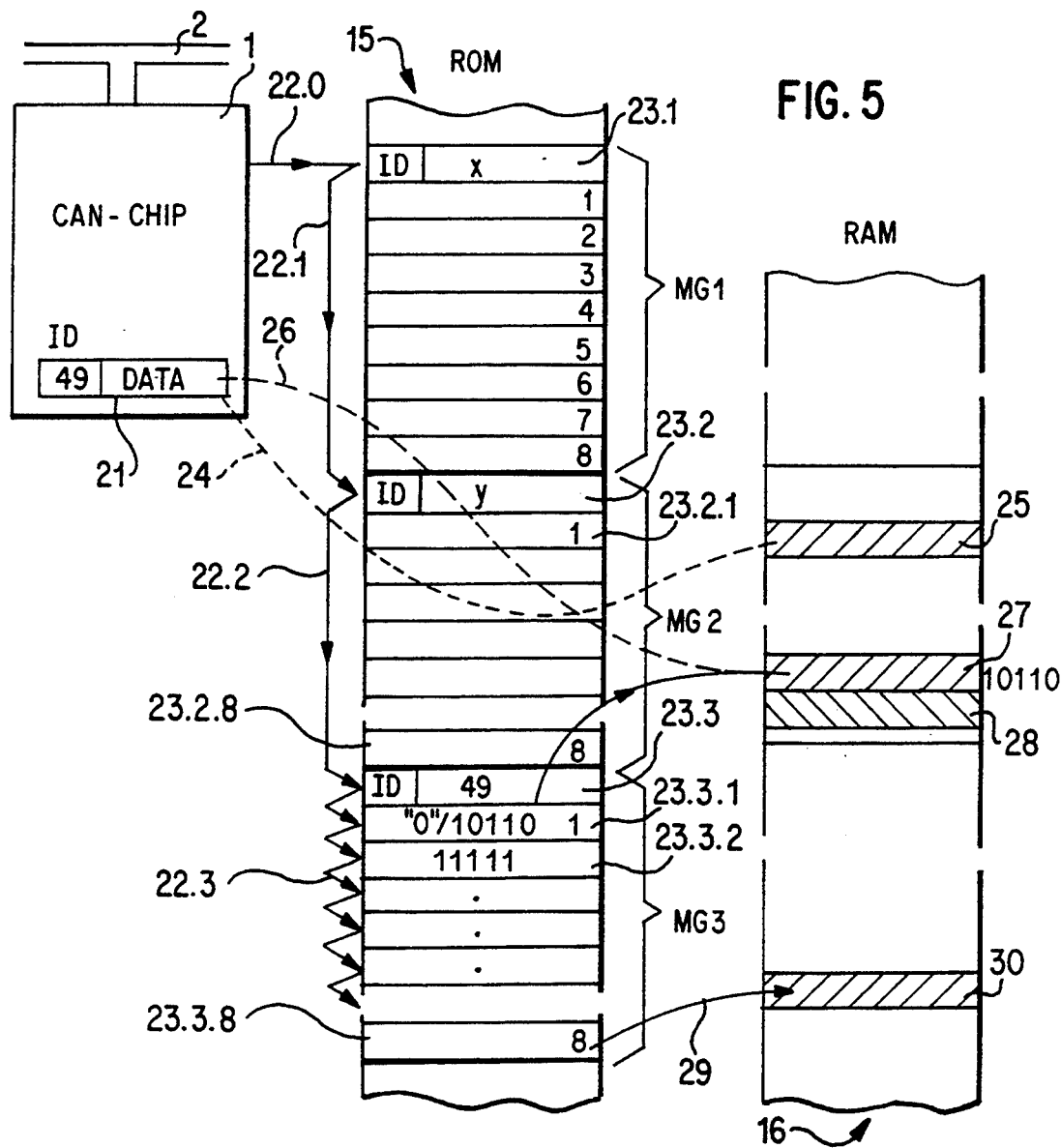
FIG. 5 shows an illustration of copying functions of the driver module.

In order to offer an application the possibility of selection of data to be received (for example for filtering and/or checking functions), at least two, further "precopy" and "postcopy" subroutines are installed in the driver module which is to be produced in accordance with the method, which subroutines allow the application to have an influence on the received data immediately before reception of data and immediately after reading received data out of the reception buffer register 21 of the CAN chip 1 into the target variable (target memory location in the RAM of the application). FIG. 5 shows how these two functions operate.

The reference numeral 21 designates the reception buffer register of the CAN chip 1 which is connected to the bus 2 and into which the reception messages are loaded from the bus. Reference numeral 15 designates a small section of the ROM and 16 a small section of the RAM of the application. For example, provided in the ROM 15 are memory areas 23.1, 23.2, 23.3, etc. into which identifiers, in this case x, y, and 49, for example, for reception information are written. Here, for example, eight further memory locations 23.1.1 to 23.1.8, 23.2.1 to 23.2.8, 23.3.1 to 23.3.8, etc. are allocated to each identifier, in which locations parameters associated with the respective identifier are stored.

In the RAM 16, three different memory locations 25, 27 and 30 are highlighted, in which a received message can be stored. In this case, it is assumed that the memory location 25 is provided for storing the received message in order to process it further immediately, the memory location 27 is provided for storing message for the purpose of carrying out any type of processing before further processing, and the memory location 30 is provided for storing a copy of the received message after it is written, on reception, into the RAM 16.

The operation is as follows. Messages are sent via the bus 2 using the broadcasting method and to this extent thus, in principle, reach all the CAN chips of the controllers which are connected individually to the bus. To the extent that these are not CAN chips having 100% acceptance filtering, that is to say, for example, FULLCAN chips, at least the filtering and discrimination of the received messages takes place outside the CAN chip 1, by means of the driver module.

As soon as any desired message has been loaded into the reception buffer register 21, the application accesses the ROM 15 using the interrupt-service routine 22.0 and checks, for example by successive interrogation 22.1, 22.2, all the identifiers stored there in the memory locations 23.1, 23.2, 23.3, etc. for correspondence with the identifier of the received message.

Under some circumstances, no correspondence is determined, which means that the received message is not evaluated because, for example, it is not intended at all for the controller being considered from a specific category of controllers, for example those having a BASICAN chip.

If, however, the reception identifier currently in the reception buffer register, assumed to be "49" here, is, for example, preloaded in memory location 23.3, the interrupt-service routine interrogates all the subsequent memory locations 23.3.1 to 23.3.8 and successively to 22.3 for the address codes contained therein for writing the received message into the RAM. For example, a "0" is written into the memory location 23.3.1. This causes the message in the reception buffer register 21 to be written (24) into the memory location 25 in the RAM 16 of the application whose address is stored, for example, in the ROM location 23.3.2. If, in contrast, a value other than "0"—in this case, for example, "10110"—is written into the memory location 23.3.1, then this value is interpreted as the start address of a user function which is provided for the purpose of evaluating, filtering etc. the received data. This user function is stored with this address in the memory location 27 of the RAM 16 of the application, and under which the message in the reception buffer register 21 is placed (precopy) before being further processed (and for this purpose is then stored, for example, in memory location 25). For this purpose, the received message could, for example, be temporarily stored in a buffer memory location 28 in the RAM 16. Corresponding addresses of the RAM memory locations 27 and 28 can also be stored in the ROM memory location 23.3.1.

In contrast, a specific value in the final memory location 23.3.8 results in the received message which has already been written into the RAM 16 for the purpose of reception processing being copied 29 into a special memory location 30 in the RAM 16 (postcopy) which, for example, can be important for a controller which evaluates the change with time of a measurement variable and to that extent is informed of the recording of in each case at least one last or previous measured value.

Thus, in the course of data reception, short, application-specific operations with respect to received data can be carried out objectively, such as the demultiplexing of a CAN data packet into individual variables, selection of specific bytes from an information item, diversion of data which have been received but are erroneous, additional or more stringent reception filtering, interpretation or classification or description of data before they are stored, etc.

As can be seen, these two routines disclose a highly different processing capability of received messages. They are activated simply by calling precopy {pointer to the reception communications object} or postcopy (pointer to the reception communications object} f. Remote request service

The driver module can also support the remote properties of the CAN protocol. In the case of applications having CAN chips which do not support any automatic response of a remote request, the corresponding remote requests service function supports the imminent remote request function of CAN chips which support the overall CAN protocol without any limitation and can work autonomously, such as FULLCAN chips. In this case, the transmit function can transmit remote messages to the bus by means of a control flag which is designated in the CAN protocol. Received remote frames are processed and responded to either by the FULLCAN chip or by the driver module. The applications software 11 or the application is informed of this via a suitable status information item which is stored in the already mentioned data field 16.

Figure 4:
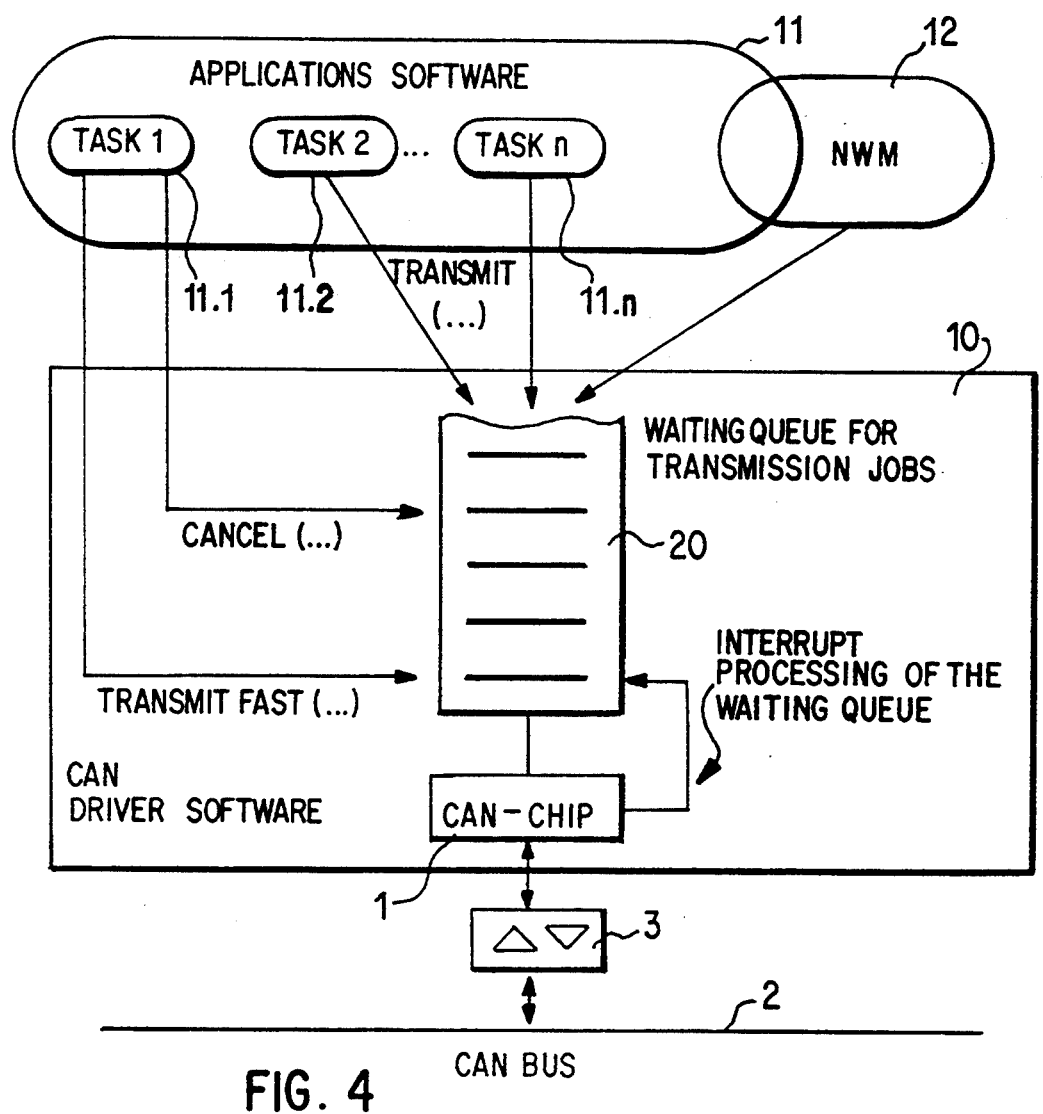
FIG. 4 shows a schematic illustration of the processing of a transmission waiting queue.

For processing rapidly successive transmission requests and for implementing a multi-tasking capability of the driver module 10, it is advantageous to implement a transmission waiting queue 20 therein, in accordance with FIG. 4. Its administration and processing preferably takes place synchronously and in an interrupt-controlled manner by the CAN chip. The programmer of the applications software is then isolated from the CAN chip with respect to send sequences as well and therefore does not need to know them.

In addition to requests on the part of the application, transmission requests of a special network management module 12 can also be loaded into such a waiting queue, which module 12 is more or less firmly linked into the applications software 11. The applications software 11 is in each case currently informed of the respective state of the transmission job by means of communications-object-related status information which is written in the status file in the RAM 16 of the application.

The transmission waiting queue produces a highly advantageous decoupling in time between the applications software, the CAN bus conditions and individual tasks 11.1, 11.2, 11.3, etc. of the applications software.

Since such a waiting queue involves a certain mean minimum flow rate delay for transmission requests with respect to a current transmission call on the part of the applications software, as a result of its synchronous processing as a function of the bus loading, an expansion of the transmit function must be provided for particularly urgent messages, specifically a:

g. Preferred treatment of data to be transmitted

A preferred immediate sending of a communications object which has been loaded into the communications waiting queue is possible by means of the simple call TransmitFast {pointer to the transmission communications object}

This driver call results in the related communications object being written into the lowest waiting location in the waiting queue when transmission jobs are already waiting, and waiting jobs thus being displaced one place higher, from where the communications object is thus transferred immediately into the transmission buffer register of the CAN chip when the next interrupt occurs.

The already mentioned transmission termination cancel {pointer to the transmission communications object} in conjunction with the transmission waiting queue causes the cancellation of a transmission call which is located In the waiting queue or already in the chip, with the effect that all jobs written into the waiting queue after this call are pushed one location upwards in priority (or downwards in the symbolic representation selected in FIG. 4 of the waiting queue as a FIFO register), from where they are then processed one interrupt step earlier.

This function thus allows, for example, an information item which is already loaded into the waiting queue for sending and which it has not yet been possible to send, for example because of high bus loading, and which has therefore already become out of date and should be replaced by one which is more current, to be made ineffective; the currently available information item can then be sent in a preferred manner by means of the TransmitFast function (priority boost).

Standby functions can also be implemented in the driver module, for example:

h. Power down
By means of the call

PowerDown { }, the CAN chip can be changed into the power-saving standby mode generally or as a function of an argument.

i. Wake up
The function

WakeUp { } is written by the programmer of the applications software himself or herself and is called by the driver module after a corresponding Wake-Up interrupt from the CAN chip.

To this extent, it can be seen that the method according to the invention for producing program code for programming the ROM of a bus-compatible motor vehicle controller supported by at least one microcomputer on the one hand leads to a considerable increase in the discipline of the applications program and—to the extent that in each case all the controllers on the bus use only the centrally tested functions of corresponding driver modules—to making communication in the network more effective.

Figure 6:
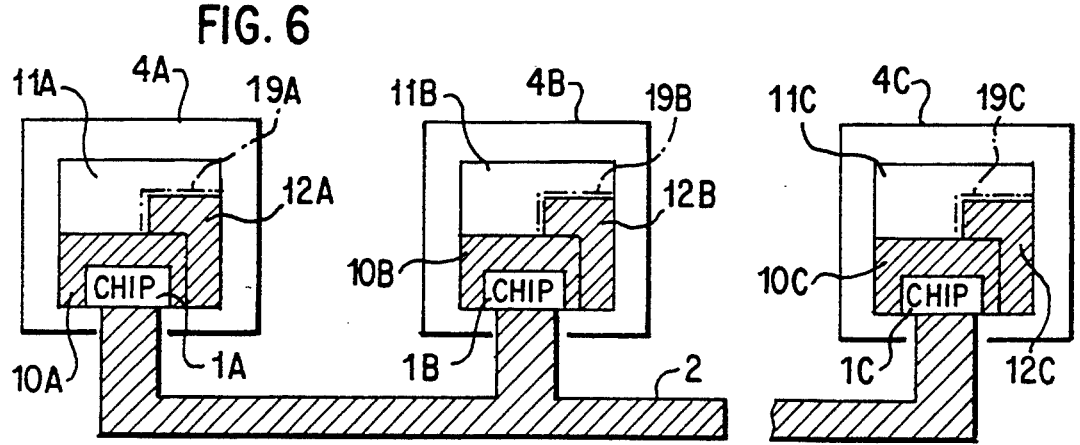
FIG. 6 shows a schematic illustration of a plurality of controllers which are equipped with different CAN chips and are integrated to form a virtual unit.

FIG. 6 also shows how a multiplicity of controllers 4A, 4B, 4C etc. which are programmed in accordance with the method and can be equipped with entirely different CAN chips 1A, 1B, 1 C, etc. are coupled to one another via the bus 2. The special case is shown here, in the case of which there is no special communications module 13, and the corresponding routines are in each case integrated in the apparatus specific applications software 11A, 11B, 11C, etc.

In this case, suitable driver modules 10A, 10B, 10C, etc. produce the connection between the respective applications programs 11A, 11B, 11C, etc. in the various controllers 4A, 4B, 4C, etc. partially directly and partially via parts 12A, 12B, 12C, etc. of higher-level network management software.

It can furthermore be seen that the parts which are shown shaded form a virtually integral information system, that is to say a virtual functional unit, which, as a result of the network management software, which is accommodated in a distributive manner in all the controllers, offers identical functionality for all the controllers 4A, 4B, 4C, etc. both in the direction of the respective applications software and in the direction of the bus 2, if these controllers 4A, 4B, 4C, etc. are equipped only with CAN chips of identical protocol utilization width.

It can additionally be seen that, when the method according to the invention is used for programming bus-compatible electronic controllers in a motor vehicle, identical conditions can be specified and used both for the production and for the testing of highly varied applications software 11A, 11B, 11C, etc. for the individual controllers 4A, 4B, 4C, etc.—irrespective of the apparatus-specific CAN chip or chips used—which results in considerable time and cost savings and a reliability improvement.

Finally, it can be seen that in using the method according to the invention, the implementation of the information transmission system is formed as virtually a single unit. The information transmission system is formed by the shaded parts. There are thus provided for this purpose network management modules 12A, 12B, 12C, etc. which are capable of communication on the one hand with the respective driver modules 10A, 10B, 10C, etc. and on the other hand, via communications interfaces 19A, 19B, 19C, etc. which are likewise common, with the respective applications software 11A, 11B, 11C, etc.

In practice, this effective structure results simply by linking network management modules 12A, 12B, or 12C, which are tested centrally in an analogous manner, together with the respective CAN chip-specific driver module 10A, 10B or 10C, to the respective applications software 11A, 11B, 11C in a manner which largely precludes network faults.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for programming a bus-compatible electronic motor vehicle controller that is equipped with at least one microcomputer to implement its control function and with ROM and RAM in order to accommodate and handle applications software required for the control function, and is also equipped with at least one bus protocol chip, and the ROM being programmed such that the applications software communicates with a bus via the at least one bus protocol chip and via a specific instruction and communications interface forming a first interface of said at least one bus protocol chip, comprising:

providing a second interface, which is independent of the at least one bus protocol chip, and defining the second interface as a standard instruction and communications interface;

coupling said first and second interfaces with a driver module that is independent of the applications software and adapted to the at least one bus protocol chip and has the properties of an adapter;

matching and aligning the applications software exclusively to the second interface with respect to the bus communication and producing the applications software independently of the at least one bus protocol chip;

linking the applications software and the driver module to one another by a link process;

obtaining program code as a result of the link process; and storing the program code such that the program code is resident in said ROM;

wherein the driver module performs at least the following functions after linking to the applications software;

initializing at least one of bus protocol chip communications paths and the at least one bus protocol chip before start of a communication;

retrieving transmission data from at least one RAM address, loading the transmission data into a transmission register of the at least one bus protocol chip and causing the transmission data to be read out onto the bus; and retrieving received data from a reception register of the at least one bus protocol chip and loading the received data into at least one predetermined memory location in the RAM of the microcomputer.

2. Method according to claim 1, wherein the driver module performs at least the following further functions after linking to the applications software;

constructing and administrating a waiting queue for transmission communications objects;

sending the transmission communication objects from the waiting queue in a priority basis; and cancelling transmission jobs in an individual, selective manner before the transmission jobs are sent.

3. Method according to claim 1, further comprising providing at least one further module that is independent of the applications software and independent of the at least one bus protocol chip, and linking the at least one further module, together with at least one of the applications software and the driver module by a link process, in order to obtain the program code which can be stored in the ROM of the controller.

4. Method according to claim 1, wherein the driver module performs at least the following further function after linking to the applications software:

positioning received data from a reception register of the at least one bus protocol chip under a processing function, and loading the received data, processed in this manner, into at least one predetermined memory location in the RAM of the microcomputer of the motor vehicle controller.

5. Method according to claim 1, wherein the driver module performs at least the following further function after linking to the applications software:

changing the at least one bus protocol chip into a power-saving standby mode.

* * * * *